Patented May 14, 1935

2,001,016

UNITED STATES PATENT OFFICE 2,001,016

PRODUCTION OF IRON-CHROMIUM ALLOYS

Alexander L. Feild, Baltimore, Md., assignor, by mesne assignments, to Rustless Iron Corporation of America, Baltimore, Md., a corporation of Maryland No Drawing. Application July 10, 1934, Serial No. 734,513

11 Claims. (Cl. 75—22.5)

This invention relates to the production of iron-chromium alloys and more particularly to the production of rustless iron.

Among the objects of my invention is the production in a simple, efficient and economical manner of successive heats of low-carbon iron-chromium alloys, one of which contains one or more supplementary elements which are not readily oxidizable and another of which is substantially free of these supplementary non-oxidizable elements, employing available and inexpensive raw materials including large quantities of iron-chromium scrap containing one or more supplementary non-oxidizable elements and utilizing known furnacing and operating equipment.

The invention accordingly consists in the combination of elements, mixture of materials and composition of ingredients and in the several steps and the relation of each of the same to one or more of the others, as described herein and the scope of the application of which is indicated in the following claims.

As conducive to a clearer understanding of certain features of my invention it may be noted at this point that a large quantity of rustless iron scrap containing a supplementary amount of the non-oxidizable element, nickel, is coming upon the market. The major portion of this scrap is the widely used 18—8, an iron-chromium-nickel alloy analyzing approximately, 18% chromium, 8% nickel and the balance principally iron. A certain amount of 25—12 and 12—12 scrap is also available, chromium-nickel irons and steels respectively analyzing approximately, 25% chromium, 12% nickel and the balance iron and 12% each of chromium and nickel and the balance iron.

The rustless irons and steels containing these supplementary additions of nickel are not always readily distinguishable, by the persons collecting, handling and dealing in scrap metal, from the straight chromium grades of rustless iron and steel which are, desirably, substantially nickel-free. In fact, in substantially all straight chromium rustless iron and steel scrap purchased in the open market there is present a certain amount of the chromium-nickel rustless iron and steel scrap, the nickel content of which appears in the reclaimed scrap metal. As straight chromium rustless iron and steel scrap metal is reclaimed, put in use, converted into scrap and again reclaimed, the nickel content of the metal increases because of the confusion of the straight chromium and the chromium-nickel rustless iron and steel scrap. At the present time straight chromium rustless iron and steel, made by known processes where a substantial part of the finished metal is represented by rustless iron or steel scrap, contains from about .25% to .40% nickel.

Now in many applications for corrosion-resisting irons and steels the presence of a small supplementary percentage of nickel is highly objectionable. As little as .5% nickel renders the metal sluggish in its reactions and increases the difficulties incident to softening the metal by an annealing heat treatment. Where the amount of nickel present is much in excess of this figure it is extremely difficult to efficiently soften the straight chromium grades of rustless iron and steel.

The presence of a small supplementary amount of nickel in the straight chromium rustless irons and steels introduces certain difficulties in the working or forming of these irons and steels, especially in upsetting operations as in the production of bolts and studs from rod stock, and in certain severe deep-drawing operations as in the production of various cooking utensils from sheet and strip.

Accordingly, one of the outstanding objects of my invention is the production of straight chromium irons and steels substantially free of non-oxidizable elements, such as nickel, employing as sources of iron and chromium large quantities of rustless iron and steel scrap containing substantial amounts of one or more non-oxidizable elements and using known furnace and operating equipment.

Referring now more particularly to the practice of my invention, in the production of a double heat of rustless iron or steel the first of which contains a supplementary non-oxidizable element in a substantial amount and the second of which is free of this element, a suitable furnace, such as a six-ton three-phase Heroult electric arc furnace employing carbon or graphite electrodes and rated 25 cycles, 2500 kva. at 120 to 180 volts and having a chromite brick lining carried up to a height above the slag line and a silica brick roof, is prepared for the reception of a charge of raw materials in any suitable manner. Conveniently, the furnace is thoroughly heated either by means of an oil torch or by establishing electric arcs from the furnace electrodes to odd pieces of electrode butts placed on the furnace bottom.

After the furnace has been pre-heated to a desired amount the pre-heating means are withdrawn and the initial charge of ingredients comprising the raw materials for a heat of metal is charged into the furnace.

In the practice of my invention large quantities of chromium-nickel rustless iron and steel scrap are charged onto the bottom of the furnace. Along with this grade of rustless iron or steel scrap there is conveniently charged a certain amount of low-carbon steel scrap, commonly known as base scrap. Similarly, along with the chromium-nickel rustless iron or steel scrap there is conveniently charged as desired a certain amount of straight chromium rustless iron scrap.

While the relative proportions of chromium-nickel rustless iron scrap, base scrap and straight chromium rustless iron scrap initially charged into the furnace may vary within wide limits it is desirable in the production of rustless irons and steels of the higher nickel contents to employ a maximum of available chromium-nickel rustless iron or steel scrap. In the production, however, of chromium-nickel rustless irons and steels of lower nickel contents sufficient chromium-nickel iron or steel scrap is employed to give a desired nickel content in the tapped metal and straight chromium rustless iron scrap and low-carbon steel scrap in suitable relative proportions comprise the remainder of the scrap initially charged.

In the production of chromium-nickel rustless irons and steels of the lower nickel contents a maximum of the straight chromium rustless iron or steel is employed since this material is ordinarily readily available and affords a cheap source of chromium. Base scrap or low-carbon steel scrap is then added in such an amount as to make up the balance of the scrap initially charged.

While the straight chromium rustless iron or steel scrap is usually available in and around the melt shop and various customer plants in the form of ingot butts, crop ends, scrap sheet, punchings, clippings and the like, amounting to from 25% to 70% of the metal tapped, all as more particularly pointed out in the copending application of William Bell Arness, Serial Number 719,810, filed April 9, 1934 and entitled Production of rustless iron, there is occasionally experienced a shortage in rustless iron or steel scrap or such scrap may be had only at a premium. Under these conditions in the production of chromium-nickel rustless irons and steels of the lower-nickel contents base scrap forms a substantial part of the scrap initially charged into the furnace and the desired chromium addition is made with the inexpensive chromium-containing ingredient, high carbon ferrochrome. Of course, it will be understood that in the production of such a heat of metal rustless iron or steel scrap may be entirely omitted from the charge where such practice is found desirable.

Along with the initial charge of chromium-nickel rustless iron or steel scrap, base scrap and/or straight chromium rustless iron or steel scrap, there is preferably charged in the production of a heat of metal of high chromium and high nickel contents, a desired amount of the inexpensive high carbon ferrochrome. The chromium contained in the high carbon ferrochrome directly supplements the chromium present in the chromium-nickel rustless iron or steel scrap. Inasmuch as the chromium available in the chromium-nickel iron or steel scrap is ordinarily sufficient to give a chromium-nickel rustless iron of desired chromium analysis as the product of the first of the double heats of metal, the amount of high carbon ferrochrome added is usually quite small. It will be understood, however, that where a higher chromium content is desired in the chromium-nickel rustless iron or steel, this result may be achieved by increasing the amount of high carbon ferrochrome added to the charge. The amount of high carbon ferrochrome necessary to supplement the chromium coming from the chromium-nickel rustless iron or steel scrap and achieve a desired analysis is determined empirically since a very large proportion of the chromium introduced with the chromium-nickel iron or steel scrap, the straight chromium rustless iron scrap and the high carbon ferrochrome is oxidized and lost from the first of the heats of metal, as more particularly described hereinafter.

In order that the second of the double heats of metal may be inexpensively supplied with a desired amount of chromium, large quantities of chrome ore are preferably charged into the furnace along with the iron scrap. While this supplementary addition of chromium is preferably made in the form of chrome ore, because of the somewhat favorable price margin of this ingredient over high carbon ferrochrome, it will be understood that as a matter of convenience in furnacing the charge of ingredients the amount of chrome ore ordinarily used may be partially or completely replaced by an equivalent amount of high carbon ferrochrome, making due allowance, however, for the fact that a large portion of the chromium content of the high carbon ferrochrome, as contrasted with the chromium content of the chrome ore (which is in a combined form), goes directly into the first of the double heats of metal. Excellent furnace and operating conditions are obtained, however, where a balanced charge of chromium-nickel rustless iron or steel scrap, base scrap and/or straight chromium iron or steel scrap, high carbon ferrochrome and chrome ore is melted down in the furnace.

Along with the ingredients charged into the furnace, there is charged an oxide of iron, preferably roll or mill scale, to oxidize carbon from the ingredients as well as to remove and/or exclude carbon coming from the furnace electrodes. The amount of iron oxide charged into the furnace is largely determined by the tendency of the ingredients to pick up carbon from the furnace electrodes during the melt-down stage of the process, as more particularly pointed out hereinafter, and to a lesser extent upon the amount of carbon directly introduced with the iron scrap and high carbon ferrochrome. Ordinarily the particular amount of iron oxide introduced with the charge in order to achieve tapped metal of a low carbon content is determined empirically.

In order to assure the production of sound metal free from blow-holes, gas-pockets and the like the large quantity of chrome ore charged into the furnace is preferably thoroughly dried at a high temperature prior to the charging. The predrying of the ore is carried out in any suitable manner, as by a long heating of the ore in a rotary gas-fired kiln at such temperatures as to rid the ore of substantially all free and combined moisture normally present. Other materials which normally have a substantial moisture content, either in a free or combined form, likewise are preferably pre-dried before charging into the furnace, as appears more fully hereinafter.

The use of materials which are thoroughly pre-dried to free them of the large quantities of moisture ordinarily present as a result of the long exposure to atmospheric conditions during the transportation and storage of the materials, effectively minimizes the amount of moisture introduced into the furnace and effectively limits the amount of hydrogen gas evolved as a result of the decomposition of this moisture by the intense heat and electrical action of the electric furnace arcs. The limitation thus imposed upon the amount of evolved hydrogen effectively prevents the metal from absorbing an excess quantity of hydrogen during the prolonged melt-down period and so precludes the subsequent freeing of large quantities of gas during the solidification of the metal in the molds causing blow-holes, gas-pockets, pitted sections and like defects, all as more particularly described in Patent 1,925,916 granted to William Bell Arness on September 5, 1933 and entitled Process of producing alloys.

As illustrative of the practice of my invention, in the production of a double heat of rustless iron to desired specifications of chromium 8% to 10%, nickel 8% to 10%, carbon .07% maximum and the balance substantially iron with the usual percentages of silicon, manganese, sulphur and phosphorus for the one specification, and chromium 12% to 14%, carbon .07% maximum and the balance substantially iron with the usual percentages of silicon, manganese, sulphur and phosphorus ordinarily found in rustless iron for the other specification, 12,500 pounds of 18—8 chromium-nickel rustless iron scrap (having an average analysis of about 18% chromium, 8% nickel, .10% carbon and the balance substantially iron), 1,110 pounds of low-carbon steel scrap, 300 pounds of high carbon ferrochrome (analyzing approximately, 70% chromium, 6% carbon and the balance substantially iron), 2,000 pounds of chrome ore (analyzing approximately, 48% chromium oxide, $Cr_2O_3$, 15% iron oxide, $Fe_2O_3$, and the balance non-reducible oxides of aluminum, magnesium, silicon and calcium) and 3,400 pounds of roll scale are charged onto the chromite bottom of the electric arc furnace previously prepared for the reception of the charge, all as more particularly described above.

Electrical power is applied to the furnace electrodes, arcs are struck from the electrodes to the charge of ingredients and the ingredients begin to melt down first forming pools of metal immediately beneath the furnace electrodes. Under the continuing action of the intense heat of the electric furnace arcs these individual pools of metal soon merge forming a single bath of ferrous metal containing chromium and nickel. The melting ingredients form a thick blanket of slag, rich in the oxides of iron and chromium, overlying the metal bath.

The strongly oxidizing character of the slag blanket is effective throughout the melt-down period in oxidizing carbon supplied the bath of metal by the low-carbon steel scrap, the chromium-nickel rustless iron scrap and the high carbon ferrochrome. This slag blanket furthermore acts as an effective barrier between the bath of metal and the carbon or graphite furnace electrodes to prevent the pick-up of carbon from the electrodes in spite of the great avidity of the chromium-containing ferrous metal bath for this element.

Incident to the removal and/or exclusion of carbon from the bath of metal by the oxidizing action of the blanket of slag overlying the bath there is a great tendency for chromium to be oxidized from the bath. In order to minimize this oxidation of chromium the melting operation is preferably carried out at a high temperature. This high operating temperature, which for convenience I designate as a temperature of superheat, promotes a preferential oxidation of carbon and permits the removal and/or exclusion of carbon from the metal with a minimum oxidation of chromium. The use of this high operating temperature furthermore assures a very thorough oxidation of carbon from the bath and the realization of an extremely low carbon product, where desired, all in a minimum of time and with the consumption of a minimum of electrical energy.

No reliable method is known to me for precisely determining the temperatures of metal and slag during the melting down of the charge of ingredients but it is estimated that these temperatures are from 3100° F. to 3200° F., temperatures which are some 150° F. to 300° F. higher than those ordinarily encountered in electric steel making practices. The use of such an unusually high operating temperature is permitted by virtue of the highly refractory nature of the furnace bottom employed, which, as indicated above, is of chromite brick.

The oxidation of chromium from the metal bath as a result of the oxidizing action of the overlying blanket of slag is materially lessened by the inhibiting effect of the large quantities of chromium oxide initially present in the slag. During the melting down of the charge of ingredients a high balance exists between the molten chromium oxide contained in the slag and the chromium oxide dissolved in the metal bath which effectively limits the oxidation of chromium from the bath and further contributions of chromium oxide to the slag. The inhibiting effect of this large quantity of chromium oxide greatly contributes to the realization of a ferrous metal bath of high chromium content.

While, as indicated above, a considerable portion of the chromium available in the chromium-nickel rustless iron scrap and in the high carbon ferrochrome is oxidized and as chromium oxide is transferred into the slag, all but a negligible part of the nickel available in the chromium-nickel iron scrap goes into the bath of metal. As a result of the relatively unoxidizable character of nickel none of the nickel available in the chromium-nickel iron scrap appears in the slag.

After the charge of ingredients is completely melted down samples are taken from the bath for the purpose of determining the carbon and chromium analyses. When the samples indicate that the carbon is at or below the maximum permissible value and the chromium content lies within the specified limits, the melt-down period is at an end. In the illustrative example of the practice of my invention representative samples taken from the metal bath at this stage of the process analyze .06% carbon, 9.74% chromium, 7.85% nickel and the balance principally iron.

At this stage of the process the furnace contains a bath of ferrous metal of desired specified analyses of chromium, nickel and carbon covered by a thick blanket of slag. In the slag there are available great quantities of iron and chromium in the form of oxides of these metals. Ordinarily, the amount of chromium present in the slag as chromium oxide is approximately equal to the amount of chromium present in the ferrous metal bath underlying the slag, all as more particularly indicated in applicant's Patent No. 1,925,182, granted September 5, 1933 and entitled Process for the manufacture of rustless iron.

When the melt-down period is finished the application of power to the furnace is discontinued, the furnace electrodes are raised and the first of the double heats of metal is tapped from beneath the overlying blanket of slag into a suitable ladle for teeming or for transfer to a second furnace for refining. While fairly effective deoxidation of the tapped metal is achieved in the ladle by adding one or more of the deoxidizing agents, manganese, silicon, aluminum, titanium, zirconium or the like, the metal is preferably transferred to a second furnace for refining. For this purpose, conveniently a six-ton three-phase Heroult electric arc furnace rated 25 cycles, 2500 kva. at 120 to 180 volts carrying a magnesite lining preferably pre-heated in any convenient manner, as indicated above, is employed.

Electrical power is applied to this furnace, arcs are established from electrodes to metal and the bath of metal is maintained at a desired refining temperature beneath a basic finishing slag of burnt lime and fine ferrosilicon. During the refining period the slag ingredients, burnt lime and fine ferrosilicon, preferably of the 75% silicon grade, are scattered over the surface of the metal bath from time to time as furnace conditions require. In the illustrative embodiment described above about 500 pounds of burnt lime and 40 pounds of fine ferrosilicon of the 75% grade are effective in achieving a desired refining of the metal.

During the refining period final adjustment is made of the chromium, nickel, silicon and manganese contents of the metal bath in any desired manner. The desired increase in the chromium content of the bath is achieved by adding low-carbon ferrochrome during this period. Similarly, the nickel content of the metal is increased as desired by an addition of electrolytic nickel. The silicon and manganese additions are preferably made by adding silico-manganese, although lump ferrosilicon and lump ferromanganese may be employed where desired. Because of the readily oxidizable character of silicon and manganese these additions are preferably made toward the end of the refining period.

After a suitable refining of the heat of metal is achieved the application of power to the refining furnace is discontinued, the electrodes are raised and the heat of metal is tapped into a ladle for teeming. The metal is poured into suitable ingot molds and produces 14,900 pounds of ingots having an average analysis of .06% carbon, 9.6% chromium, 7.9% nickel, .25% manganese, .45% silicon, .03% sulphur, .03% phosphorus and the balance substantially iron. The metal is clean, sound and substantially free of objectionable oxide inclusions; freedom of the metal from oxide inclusions being in a large measure due to the refining of the metal in a magnesite lined furnace.

At this point it may be noted that the chromium-nickel rustless iron produced as the first of the double heats of metal is of substantially lower carbon content than that produced in accordance with heretofore known and/or used processes. This highly desirable result is achieved because of the minimization of the length of time for furnacing ferrous metal of considerable chromium content which, as indicated above, has a great thirst for carbon. By tapping the first of the double heats of metal almost immediately after the melt-down of the raw materials is completed a minimum carbon content is assured. During the refining period which is quite short and which is quite free of irregular furnace operating conditions (the thin fluid finishing slag covering the metal being refined assures minimum contact of the furnace electrodes with slag and metal), substantially no carbon is picked up by the chromium-containing bath.

Referring now back to the operation of the melting furnace from which the first of the double heats of metal has just been tapped there remains in the furnace great quantities of slag especially rich in the oxides of chromium, as more particularly indicated above. This slag is free of nickel. In the production of rustless iron as the second of the double heats of iron-chromium alloys great quantities of iron scrap, either low-carbon steel scrap or rustless iron scrap, or both low-carbon steel scrap and rustless iron scrap in desired proportions, are charged upon the slag present in the furnace while this slag retains much of its sensible heat.

Rustless iron scrap is ordinarily omitted from the addition of iron scrap to the furnace at this stage of the process since sufficient chromium to achieve metal of the desired chromium analysis is usually present in the slag as oxides of chromium. The omission of rustless iron scrap precludes the introduction of nickel into the metal and assures the production of an iron-chromium alloy containing but a negligible amount of this element. In the example illustratively described above low-carbon steel scrap amounting to about 12,500 pounds is charged onto the hot slag retained in the furnace.

Electrical power is again applied to the furnace and the base scrap melts down, the melting metal trickling through the large quantities of slag present and forming a second bath of ferrous metal beneath the slag. As the application of power is continued more and more of the scrap is melted and contributes to the bath of ferrous metal underlying the slag.

At this point it may be noted that inasmuch as there is very little chromium present in the second bath of ferrous metal (the small amount of chromium present comes out of the furnace bottom and the slag retained in the furnace and amounts in all to about 1%), the tendency toward carbon pick-up from the furnace electrodes is reduced to a minimum. This is a feature which is particularly important in the production of rustless iron of extremely low-carbon contents (of the order of .03% to .06%). Where there is a tendency for the chromium content of the second bath of ferrous metal to increase or where an extremely low carbon content is desired iron oxide is charged onto the slag along with the iron scrap. Ordinarily, however, there is a sufficient amount of iron oxide in the slag to maintain desired oxidizing conditions during the further practice of the process.

When the iron scrap is completely melted forming the second ferrous metal bath beneath the slag the second melt-down period is at an end. At this stage of the process samples of metal taken from the bath analyze approximately .04% carbon, .8% chromium and the balance principally iron.

The large quantities of iron and chromium which are found in the slag as oxides of these metals at this stage of the process are recovered in a reducing period where a non-carbonaceous reducing agent, such as ferrosilicon, preferably employed in an amount chemically in excess of the oxides of iron and chromium present, is charged onto the slag overlying the bath of metal. To further increase the amount of chromium available and to take advantage of the heat expended during the reducing period considerable quantities of chrome ore are conveniently charged onto the slag during the reducing period from time to time as furnace conditions permit. In the embodiment illustratively described the chrome ore added in this manner amounts in all to about 1,700 pounds, a substantial portion of which is added immediately prior to the addition of the reducing agent. The precise amount of reducing agent employed to achieve a desired high recovery of chromium from the slag is ordinarily determined empirically. For the illustrative embodiment described above crushed ferrosilicon of the 75% grade amounting to about 1,900 pounds is used.

In order to prevent a contamination of the metal bath with silicon of the reducing agent during this stage of the process, in spite of the excess quantity of silicon employed, the reduction step is conducted under strongly basic slag conditions. The desired basic conditions are preferably achieved by adding to the slag burnt lime in an amount of about three to five times the total silicon content of the ferrosilicon employed. For the example given 5,000 pounds of burnt lime are used in order to maintain the desired basicity.

The burnt lime employed is preferably predried in a manner more particularly indicated above to free it of substantially all free and combined moisture normally present and thereby assure the production of metal sound and free from blow-holes, gas-pockets and the like, all as more particularly described in the above-mentioned Patent No. 1,925,916 of William Bell Arness. The maintenance of the desired strongly basic slag conditions during the entire reduction period is assured by charging the burnt lime and reducing agent as a mixture onto the slag containing the oxides of iron and chromium. Conveniently, the lime and the silicon reducing agent are mixed together on the floor of the melt shop and then charged onto the slag overlying the bath of metal from time to time as furnace conditions permit.

By carrying out the reduction of oxides contained in the slag under strongly basic conditions the acid silicates resulting from the reduction of the reducible oxides by the silicon reducing agent employed react with the basic lime added to the slag thereby forming a series of calcium silicates which are among the most stable components of the slag, all as more particularly described in Patent No. 1,932,252 of William Bell Arness granted October 24, 1933 and entitled Process of producing alloys. Contamination of the metal bath by the acid silicates found in the slag is thus effectively prevented.

After all of the reducing agent and burnt lime have been added and have fused and completed their reactions with the ingredients present in the slag and metal the reduction stage of the process is at an end. The completion of the reducing period, achieving a high recovery of the oxides of iron and chromium present in the slag, is evidenced by a change in color of successive samples of the slag taken from the furnace from a black to a light green or gray.

The slag from which the metallic values are recovered is then withdrawn from the furnace and the second of the double heats of metal is refined under a suitable finishing slag. While this heat of metal may be conveniently refined in the melt-down furnace in accordance with standard refining methods the heat of metal is preferably tapped into a ladle for transfer to the refining furnace referred to above. The refining of this heat of metal is carried out in a manner more particularly described above employing about 500 pounds of burnt lime and 50 pounds of crushed ferrosilicon of the 75% grade in the preparation of a basic finishing slag. After the heat of metal is adjusted for chromium, silicon and manganese contents the heat of refined metal is tapped into a ladle for teeming.

The metal is poured into suitable ingot molds where it is allowed to cool and for the illustrative example given produces about 18,000 pounds of rustless iron ingots analyzing approximately, .06% carbon, 12.5% chromium, .40% manganese, .40% silicon with the usual low percentages of sulphur and phosphorus and the balance substantially iron. The metal is clean and sound and has but a trace of nickel present.

Where desired in the production of the first and/or second of the double heats of metal supplementary additions of nickel, aluminum, copper, cobalt, tungsten, molybdenum, vanadium, titanium, zirconium and the like may be made either in the furnace or in the ladle in accordance with standard practice.

It will thus be seen that there has been provided in this invention an art of producing iron-chromium alloys, and especially rustless irons, which are free from the presence of non-oxidizable elements as desired in which the various objects hereinbefore noted together with many thoroughly practical advantages are successfully achieved. It will be seen that the process lends itself to the rapid, efficient and economical production of iron-chromium alloys with and without supplementary non-oxidizable elements utilizing known furnace and operating equipment and employing a maximum of available and inexpensive raw materials including iron-chromium alloys containing one or more supplementary non-oxidizable elements in substantial quantities.

It will be further seen that the process is particularly favorable to maintaining a desired economic balance between the raw materials employed as sources of chromium by relatively adjusting the proportions of ingredients, high carbon ferrochrome and chrome ore (and straight chromium rustless iron scrap where the addition of this material is found desirable) to such an extent as is consistent with the maintenance of good furnace operating conditions in order to take advantage of fluctuations in the market prices of these materials.

While in the illustrative embodiment of my invention advantage is taken of the heat available during the reduction period of the process to melt large quantities of chrome ore and have this ore react with the reducing agent employed to achieve an inexpensive addition of chromium to the second of the double heats of metal, it will be understood that where desired, as in the production of rustless irons of high chromium contents, a similar advantage may be taken of the heat available during the prolonged second melt-down period to melt a considerable quantity of chrome ore along with the iron scrap charged onto the slag retained in the furnace after tapping the first of the double heats of metal. Or, where desired, substantial quantities of chrome ore may be added both during the second melt-down period and during the reducing period, to such an extent as is consistent with good furnace operating conditions, in order to utilize a maximum of this inexpensive source of chromium in the production of the rustless iron free of non-oxidizable elements.

While, as illustrative of the practice of my invention, chromium-nickel rustless iron or steel scrap is employed as a substantial source of chromium and a complete source of nickel in the production of a double heat of metal, the first of which is chromium-nickel rustless iron and the second of which is straight chromium rustless iron containing but a negligible percentage of nickel, it will be understood that in a like manner double heats of rustless iron, one heat with and the other without appreciable percentages of copper, molybdenum, tungsten, cobalt and similar non-oxidizable elements, may be produced employing as a substantial source of alloying ingredients iron-chromium scrap containing these respective non-oxidizable elements in substantial amounts.

Likewise it will be understood that where desired the first of the double heats of metal may be held in the refining furnace while the second of these heats is being made and the two heats then refined and finished together obtaining metal of a single analysis of chromium and nickel which is especially low in carbon (because of the unusually low carbon contents of the individual heats combined to produce the single heat) as in the manner indicated in my copending application Serial Number 731,532, filed June 20, 1934 and entitled Production of iron-chromium alloys.

As many possible embodiments may be made of my invention and as many changes may be made in the embodiment hereinbefore set forth it will be understood that all matter described herein is to be interpreted as illustrative, and not in a limiting sense.

I claim:

1. In the production of a double heat of iron-chromium alloys in an electric arc furnace, the art which comprises, melting down a charge of ingredients including iron scrap containing chromium and one or more non-oxidizable elements, and an oxide of iron thereby forming a low-carbon bath of ferrous metal containing chromium and one or more non-oxidizable elements covered by a blanket of slag rich in the oxides of iron and chromium, withdrawing the bath of metal containing chromium and one or more non-oxidizable elements from the furnace leaving the slag therein, and reducing the oxides of iron and chromium contained in said slag thereby forming a ferrous product of substantial chromium content and substantially free of non-oxidizable elements.

2. In the production of a double heat of iron-chromium alloys in an electric arc furnace, the art which comprises, melting down a charge of ingredients including iron scrap containing chromium and one or more non-oxidizable elements, a material rich in chromium, and an oxide of iron thereby forming a low-carbon bath of ferrous metal containing chromium and one or more non-oxidizable elements covered by a blanket of slag rich in the oxides of iron and chromium, withdrawing the bath of metal containing chromium and one or more non-oxidizable elements from the furnace leaving the slag therein, and reducing the oxides of iron and chromium contained in said slag with a silicon reducing agent thereby forming a ferrous product of substantial chromium content and substantially free of non-oxidizable elements.

3. In the production of a double heat of iron-chromium alloys in an electric arc furnace, the art which comprises, melting down a charge of ingredients including iron scrap containing chromium and one or more non-oxidizable elements, high carbon ferrochrome, and an oxide of iron thereby forming a low-carbon bath of ferrous metal containing chromium and one or more non-oxidizable elements covered by a blanket of slag rich in the oxides of iron and chromium, withdrawing the bath of metal containing chromium and one or more non-oxidizable elements from the furnace leaving the slag therein, and reducing the oxides of iron and chromium contained in said slag thereby forming a ferrous product of substantial chromium content and substantially free of non-oxidizable elements.

4. In the production of a double heat of iron-chromium alloys in an electric arc furnace, the art which comprises, melting down a charge of ingredients including chromium-iron scrap containing chromium and one or more non-oxidizable elements, high carbon ferrochrome, chrome ore, and an oxide of iron thereby forming a low-carbon bath of ferrous metal containing chromium and one or more non-oxidizable elements covered by a blanket of slag rich in the oxides of iron and chromium, withdrawing the bath of metal containing chromium and one or more non-oxidizable elements from the furnace leaving the slag therein, and reducing the oxides of iron and chromium contained in said slag thereby forming a ferrous product of substantial chromium content and substantially free of non-oxidizable elements.

5. In the production of a double heat of iron-chromium alloys in an electric arc furnace, the art which comprises, melting down a charge of ingredients including chromium-iron scrap containing one or more non-oxidizable elements, and an oxide of iron thereby forming a low-carbon bath of ferrous metal containing chromium and one or more non-oxidizable elements covered by a blanket of slag rich in the oxides of iron and chromium, withdrawing the bath of metal containing chromium and one or more non-oxidizable elements from the furnace leaving the slag therein, melting down a quantity of iron scrap on the slag retained in said furnace, the melting scrap trickling through the slag and forming a second bath of ferrous metal therebeneath, and reducing the oxides of iron and chromium contained in said slag thereby forming a ferrous product of substantial chromium content and substantially free of non-oxidizable elements.

6. In the production of a double heat of rustless iron in an electric arc furnace, the art which comprises, melting down a charge of ingredients including rustless iron or steel scrap containing chromium and nickel, and an oxide of iron thereby forming a low-carbon bath of ferrous metal containing chromium and nickel covered by a blanket of slag rich in the oxides of iron and chromium, withdrawing said bath of metal containing chromium and nickel from the furnace leaving the slag therein, melting down iron-scrap on the slag retained in said furnace, the melting metal trickling through the slag and forming a second bath of ferrous metal therebeneath, and reducing the oxides of iron and chromium contained in the slag with a silicon reducing agent under strongly basic conditions thereby forming a ferrous product rich in chromium and low in silicon and substantially free of nickel.

7. In the production of a double heat of rustless iron in an electric arc furnace, the art which comprises, melting down a charge of ingredients including rustless iron or steel scrap containing chromium and nickel, low-carbon steel scrap, chrome ore and roll scale thereby forming a low-carbon bath of ferrous metal containing chromium and nickel covered by a blanket of slag rich in the oxides of iron and chromium, withdrawing said bath of metal containing chromium and nickel from the furnace leaving the slag therein, melting down a further quantity of low-carbon steel scrap on the slag retained in said furnace, the melting metal trickling through the slag and forming a second bath of ferrous metal therebeneath, and reducing the oxides of iron and chromium contained in the slag with a silicon reducing agent in the presence of an excess of burnt lime thereby enriching said second bath of ferrous metal in chromium with a minimum of silicon contamination.

8. In the production of a double heat of rustless iron in an electric arc furnace, the art which comprises, melting down a charge of ingredients including rustless iron or steel scrap containing chromium and nickel, high carbon ferrochrome and roll scale, thereby forming a low-carbon bath of ferrous metal containing chromium and nickel covered by a blanket of slag rich in the oxides of iron and chromium, withdrawing said bath of metal containing chromium and nickel from the furnace leaving the slag therein, refining the bath of metal withdrawn in a second furnace, melting down iron scrap on the slag retained in said first-mentioned furnace, the melting metal forming a second bath beneath the slag, and reducing the oxides of iron and chromium contained in the slag thereby enriching said second ferrous metal bath in chromium.

9. In the production of a double heat of rustless iron in an electric arc furnace having a chromite bottom, the art which comprises, melting down a charge of ingredients including rustless iron or steel scrap containing chromium and nickel, high carbon ferrochrome, chrome ore and roll scale thereby forming a low-carbon bath of ferrous metal containing chromium and nickel covered by a blanket of slag rich in the oxides of iron and chromium, withdrawing said bath of metal containing chromium and nickel from the furnace leaving the slag therein, refining the bath of metal withdrawn in a second furnace having a magnesite bottom, melting down iron-scrap on the slag retained in said furnace, the melting metal trickling through the slag and forming a second bath of ferrous metal therebeneath, reducing the oxides of iron and chromium contained in the slag with a silicon reducing agent under strongly basic conditions thereby enriching said second bath, and refining said second bath thereby forming a ferrous product rich in chromium and low in silicon and substantially free of nickel.

10. In the production of a double heat of rustless iron in an electric arc furnace, the art which comprises, melting down a charge of ingredients including rustless iron and steel scrap containing chromium and copper, and an oxide of iron thereby forming a low-carbon bath of ferrous metal containing chromium and copper covered by a blanket of slag rich in the oxides of iron and chromium, withdrawing said bath of metal containing chromium and copper from the furnace leaving the slag therein, melting down iron-scrap on the slag retained in said furnace, the melting metal trickling through the slag and forming a second bath of ferrous metal therebeneath, and reducing the oxides of iron and chromium contained in the slag thereby forming a ferrous product rich in chromium and substantially free of copper.

11. In the production of a double heat of rustless iron in an electric arc furnace, the art which comprises, melting down a charge of ingredients including rustless iron or steel scrap containing chromium and molybdenum, and an oxide of iron thereby forming a low-carbon bath of ferrous metal containing chromium and molybdenum covered by a blanket of slag rich in the oxides of iron and chromium, withdrawing said bath of metal containing chromium and molybdenum from the furnace leaving the slag therein, melting down iron-scrap on the slag retained in said furnace, the melting metal trickling through the slag and forming a second bath of ferrous metal therebeneath, and reducing the oxides of iron and chromium contained in the slag thereby forming a ferrous product rich in chromium and substantially free of molybdenum.

ALEXANDER L. FEILD.